United States Patent

[11] 3,609,328

[72] Inventor Robert B. Kieburtz
Fair Haven, N.J.
[21] Appl. No. 785,291
[22] Filed Dec. 19, 1968
[45] Patented Sept. 28, 1971
[73] Assignee Bell Telephone Laboratories, Incorporated
Murray Hill, N.J.

---

[54] MULTIAPERTURE FERRITE RESIDUE ARITHMETIC UNIT
8 Claims, 12 Drawing Figs.

[52] U.S. Cl. .......... 235/156,
307/88 LC, 340/174 CT
[51] Int. Cl. .......... G06f 7/48,
G11c 11/08, G11c 5/08
[50] Field of Search .......... 307/88;
340/174 CT; 235/156

[56] References Cited
UNITED STATES PATENTS
3,293,621 12/1966 Newhall .......... 340/174

OTHER REFERENCES
Beadles, R. L., The Implementation of a Modular Computer with Binary Logic Elements. Source unknown. 1963(?) copy in 235/156
Kieburtz, R. B. et al. Abstract of Residue Adder/Multiplier Using Multi-Aperture Ferrite Devices, in Computer Group News 1(4): p. 22, Jan. 1967, TK 7885.A1.C57

*Primary Examiner*—Malcolm A. Morrison
*Assistant Examiner*—R. Stephen Dildine, Jr.
*Attorneys*—R. J. Guenther and Kenneth B. Hamlin

---

ABSTRACT: A residue arithmetic unit is developed from multiaperature ferrite structure logic gates. Each gate is an assembly of windings on a separate aperture of a multiaperture ferrite structure. The gates are interconnected so that groups of information pulses representing two input residue numbers are applied to and are stepped through the gates in response to clock pulses, which also impart amplification to the information pulses. Output pulses represent the results of residue arithmetic operations performed on the input numbers.

INVENTOR
R. B. KIEBURTZ
BY
Charles Scott Phelan
ATTORNEY

FIG. 6A

ADDITION - $m_2$

| INPUTS | | OUTPUT |
|---|---|---|
| $\|x\|_2$ | $\|y\|_2$ | $\|x\|_2+\|y\|_2$ |
| 0 | 0 | 0 |
| 1 | 1 | 0 |
| 1 | 0 | 1 |
| 0 | 1 | 1 |

FIG. 6B

MULTIPLICATION - $m_2$

| INPUTS | | OUTPUT |
|---|---|---|
| $\|x\|_2$ | $\|y\|_2$ | $\|x\|_2 \times \|y\|_2$ |
| 0 | 0 | 0 |
| 0 | 1 | 0 |
| 1 | 0 | 0 |
| 1 | 1 | 1 |

FIG. 6C

SUBTRACTION - $m_2$

| INPUTS | | OUTPUT |
|---|---|---|
| $\|x\|_2$ | $\|y\|_2$ | $\|x\|_2-\|y\|_2$ |
| 0 | 0 | 0 |
| 1 | 1 | 0 |
| 1 | 0 | 1 |
| 0 | 1 | 1 |

FIG. 7A

ADDITION - $m_3$

| INPUTS | | OUTPUT |
|---|---|---|
| $\|x\|_3$ | $\|y\|_3$ | $\|x\|_3+\|y\|_3$ |
| 0 | 0 | 0 |
| 1 | 2 | 0 |
| 2 | 1 | 0 |
| 1 | 0 | 1 |
| 0 | 1 | 1 |
| 2 | 2 | 1 |
| 2 | 0 | 2 |
| 1 | 1 | 2 |
| 0 | 2 | 2 |

FIG. 7B

MULTIPLICATION - $m_3$

| INPUTS | | OUTPUT |
|---|---|---|
| $\|x\|_3$ | $\|y\|_3$ | $\|x\|_3 \times \|y\|_3$ |
| 0 | 0 | 0 |
| 1 | 0 | 0 |
| 2 | 0 | 0 |
| 0 | 1 | 0 |
| 0 | 2 | 0 |
| 1 | 1 | 1 |
| 2 | 2 | 1 |
| 2 | 1 | 2 |
| 1 | 2 | 2 |

FIG. 7C

SUBTRACTION - $m_3$

| INPUTS | | OUTPUT |
|---|---|---|
| $\|x\|_3$ | $\|y\|_3$ | $\|x\|_3-\|y\|_3$ |
| 0 | 0 | 0 |
| 1 | 1 | 0 |
| 2 | 2 | 0 |
| 1 | 0 | 1 |
| 2 | 1 | 1 |
| 0 | 2 | 1 |
| 0 | 1 | 2 |
| 1 | 2 | 2 |
| 2 | 0 | 2 |

FIG. 8

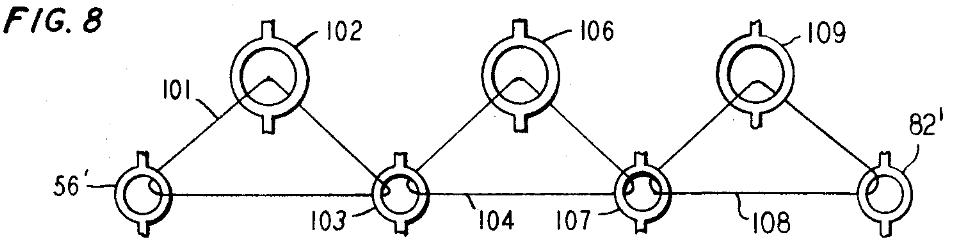

| CLOCK PHASE | PULSE APPLIED TO STRUCTURE ABOVE | | | | | | |
|---|---|---|---|---|---|---|---|
| $\Phi_1$ | P | P | – | C | C | – | P |
| $\Phi_2$ | C | – | P | P | – | C | C |
| $\Phi_3$ | – | C | C | – | P | P | – |

MULTIAPERTURE FERRITE RESIDUE ARITHMETIC UNIT

BACKGROUND OF THE INVENTION

1. Field of the Invention

The invention is a residue arithmetic unit using multiaperture magnetic logic devices.

2. Description of the Prior Art

In the prior art, residue arithmetic units use magnetic core matrices having an array of *m* by *m* cores, wherein *m* is equal to the radix of the residue number system. The array requires two sets of write-in windings corresponding to the horizontal and vertical coordinates of the array. A reset winding links all of the cores. Sense windings, equal in number to the radix, link the cores in a pattern associated with the desired arithmetic function. Input information is written into the cores by means of a coincidence current operation similar to the write-in operation used in ferrite core memories. The horizontal and vertical input windings passing through the array are arranged so that one horizontal winding and one vertical winding pass through each core. A signal on the horizontal winding represents one of two input residue members and a signal on the other winding represents the other input residue member. Drive currents are of half-select current magnitude so that drive currents which coincide in time in the horizontal and vertical write-in windings, threaded through any single core, will switch the remanent condition of that core; but a single drive current in one or the other of the two write-in windings, threaded through that single core, will not switch its remanent condition.

An output signal is generated in a single one of the senses windings in response to the coincident drive signals during the write-in operation and in response to a reset signal applied to the reset winding during readout. Both of these occurrences cause flux to switch in a single one of the cores of the array. As the flux switches, it generates a signal on the single sense winding threaded through that core. The output signals thus generated represent a residue number which is the sum (if the unit is an adder) of the two input residue numbers represented by the coincidental drive currents.

It is noted, however, that such a magnetic core matrix generates output signals limited in magnitude by the magnitude of the switchable remanent flux of the individual cores. The magnitude of this remanent flux in turn is limited by the magnitude of the input signals less any coupling losses. As a result when the flux switches to generate an output signal, the output signal is restricted to a magnitude which is less than the magnitude of the input signals. Since the magnitude of the output signal is less than the magnitude of the input signal, the output signals must be amplified by external circuits to raise their magnitude at least to the magnitude of the input signals so that subsequent circuitry is assured of having sufficient signal magnitude for proper operation.

Therefore it is an object of this invention to develop an alternative magnetic, residue arithmetic circuit which amplifies signals within the magnetic circuitry.

It is another object to arrange magnetic logic circuits to improve operating margins within the magnetic logic circuitry.

It is another object to arrange an arithmetic unit to improve radiation tolerance and enhance noise immunity.

These and other objects of the invention are realized in an illustrative embodiment thereof in which a multiaperture magnetic logic circuit responds to bipolar input signals representing input residue numbers for producing output signals representing an output residue number answer to a residue arithmetic operation performed on the input residue numbers.

A feature of the invention is an arrangement wherein residue arithmetic operations are performed by a circuit using a level of magnetic AND logic and a level of magnetic OR logic.

Another feature is an arrangement of circuits comprising multiaperture ferrite structures performing residue arithmetic functions.

Another feature is a residue arithmetic unit having translators producing signals representing input members in a plurality of moduli and a multiaperture magnetic circuit producing a group of output signals which represent, in the same plurality of moduli, an answer to a residue arithmetic operation performed on the input numbers.

A further feature of the invention is an arrangement wherein numbers of a residue arithmetic system are represented by bipolar input signals applied concurrently to all inputs of the level of AND gates.

A still further feature is an arrangement of multiaperture ferrite structures performing residue arithmetic logic functions on information signals in response to signals from a timing control which steps the information signals through a plurality of the ferrite structures and enhances the level of information signals thus stepped through the plurality of ferrite structures.

BRIEF DESCRIPTION OF THE DRAWINGS

A better understanding of the invention may be derived from the detailed description following if that description is considered with respect to the attached drawings in which:

FIGS. 6A, B, and C are truth tables relating to FIG. 2;

FIGS. 7A, B, and C are truth tables relating to FIG. 3; and

FIG. 8 is a wiring diagram of intermediate coupling loops that extend from the AND gates to the OR gates.

DETAILED DESCRIPTION

Figure 1:
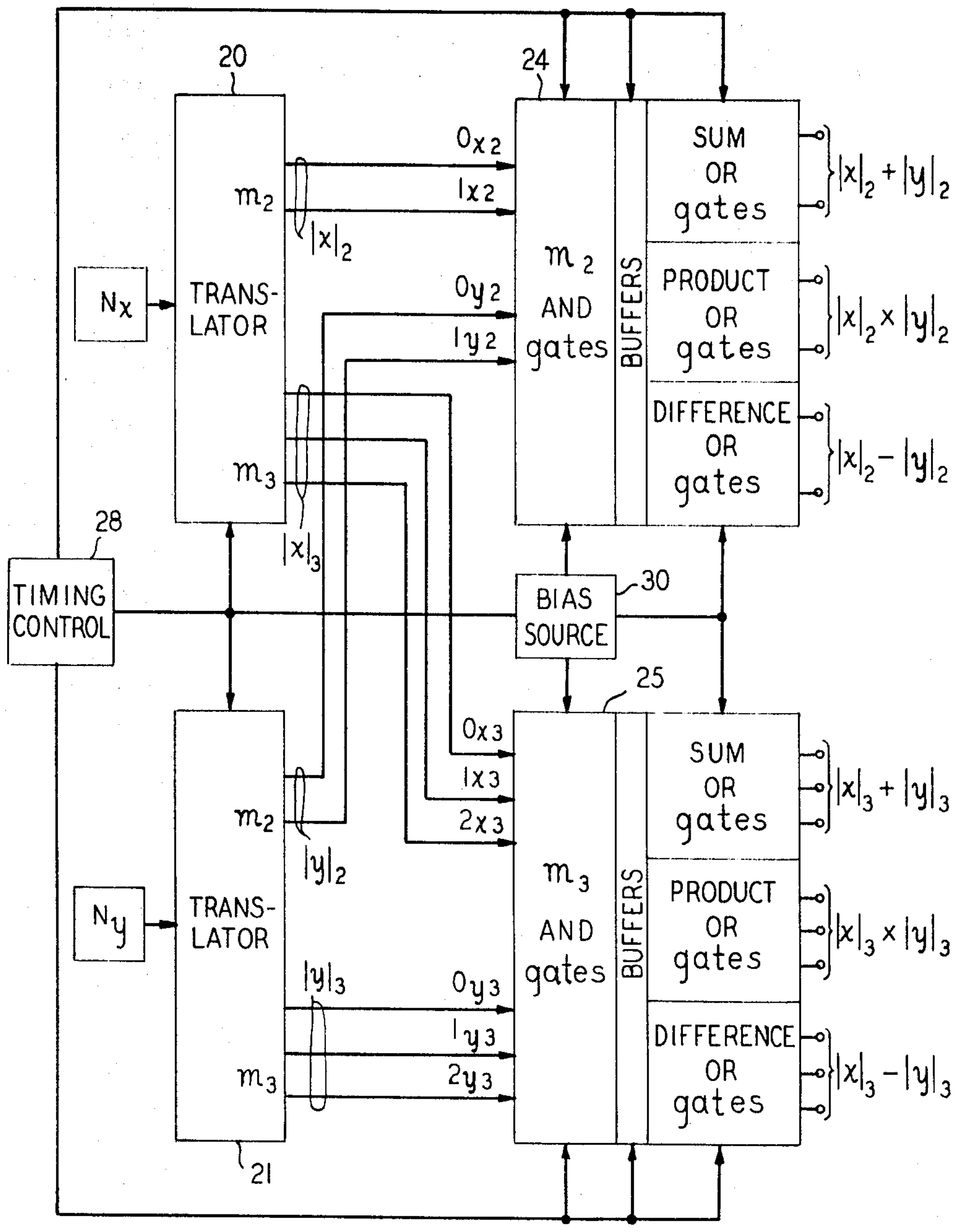
FIG. 1 is a block diagram of an embodiment of a residue arithmetic adder, multiplier, and subtractor unit arranged in accordance with the invention.

Referring now to FIG. 1, there is shown a block diagram of a residue arithmetic unit, or data processor, using gates built on multiaperture ferrite structures for performing residue arithmetic operations on two numbers $N_x$ and $N_y$, selected from a limited group of decimal numbers. In FIG. 1 binary coded signals, which represent the numbers $N_x$ and $N_y$, are produced by sources, designated respectively $N_x$ and $N_y$. These binary coded signals are applied separately to two translators 20 and 21, which are known in the art.

The translator 20 converts the binary coded signals representing the number $N_x$ into a first set of pulses representing the number $N_x$ in residue numbers having a plurality of moduli. For convenience and clarity in describing the illustrative embodiment, the moduli $m_2$ and $m_3$ have been selected as the moduli used in the illustrative embodiment. The modulus $m_2$ equals mod (2), and the modulus $m_3$ equals mod (3). The translator 20 produces the first set of pulses representing the number $N_x$ in residue numbers having the moduli $m_2$ and $m_3$ at output terminals, designated respectively $m_2$ and $m_3$.

The translator 21 converts the binary coded signals representing the number $N_y$ into a second set of pulses representing the number $N_y$ in residue numbers having the same plurality of moduli $m_2$ and $m_3$. The second set of pulses is produced at output terminals, designated respectively $m_2$ and $m_3$ on the translator 21.

Therefore the binary coded signals from the sources $N_x$ and $N_y$ are converted into two sets of pulses. Each information pulse of the first and second sets is a doublet such as those conventionally used in multiaperture ferrite technology. Each doublet is a positive polarity swing followed by a negative polarity swing or vice versa. For purposes of this description, each doublet is referred to as a pulse designated by a polarity which is the same as the polarity of its initial swing.

The coded signals from the sources $N_x$ and $N_y$ are in conventional binary number form. The translators 20 and 21 convert the binary number signals into coded signals for application to the inputs of residue arithmetic units 24 and 25. The conversion is accomplished by dividing the two input decimal numbers $N_x$ and $N_y$ separately by the modulus $m_2$ and the modulus $m_3$. The remainder of each division is the residue member which is retained for the residue arithmetic operations. These remainders are fed to four conventional binary decoders two of which are included within each of the translators 20 and 21. There is one such decoder for each modulus in each of the translators. Each decoder includes input leads for the binary coded signals and a separate output lead for each numeral of its particular radix $m_i$, where $i$=2 and 3. For representing the remainders, each decoder produces a positive pulse on a particular one of its output leads and a negative pulse on all its other output leads.

The first and second sets of pulses from the translators 20 and 21 each comprise subsets of pulses $|x|_2$, $|x|_3$, $|y|_2$, and $|y|_3$ which are combinations representing the numbers $N_x$ and $N_y$ in the moduli $m_2$ and $m_3$. For instance, the subset of pulses $|x|_2$, carried by similarly designated leads in FIG. 1, represents the modulus $m_2$ component of the number $N_x$. The $x$ in $|x|$ is derived from the subscript of the number $N_x$, and the subscript after $|x|$ indicates that the modulus $m_2$ component pertains. In a similar manner, the subset of pulses $|x|_3$ represents the modulus $m_3$ component of the number $N_x$. It should be noted that each input decimal number is translated into two portions: (1) a modulus $m_2$ portion and (2) a modulus $m_3$ portion. All of the pulses of all of the subsets $|x|_2$, $|x|_3$, $|y|_2$, and $|y|_3$ resulting from a translation of two numbers $N_x$ and $N_y$ are presented as doublets occurring concurrently in parallel on separate output leads from the respective translators.

In each of the subsets of pulses representing the input numbers $N_x$ and $N_y$ in the modulus $m_2$, there are two pulses concurrently carried on separate leads. Each lead of each subset is designated by a numeral having a double subscript. The numeral and the subscript indicate what information the lead carries. For instance in one subset $|x|_2$, the lead $0_{x2}$ carries information telling whether or not the modulus $m_2$ portion of the number $N_x$ has a value of 0. The lead $1_{x2}$ likewise carries information telling whether or not the modulus $m_2$ portion of the number $N_x$ has a value of 1. The value of the input number $N_x$ in modulus $m_2$ is indicated at the output of the translator 20 by a positive pulse on the translator 20 output lead having its designating numeral, "0" or "1," equal to the value of the modulus $m_2$ portion, or residue, of the input number $N_x$. Thus if the modulus $m_2$ residue of the number $N_x$ equals "1," the lead $1_{x2}$ carries a positive pulse. The concurrent pulse on the remaining lead $0_{x2}$ of the subset $|x|_2$ is a negative pulse. Thus the signals on the leads $1_{x2}$ and $0_{x2}$ indicate the modulus $m_2$ portion of the number $N_x$ in a one-out-of-$m_2$ code. In the subset $|y|_2$, the leads provide similar information with regard to the modulus $m_2$ portion of the number $N_y$.

In each of the subsets of pulses representing the input numbers $N_x$ and $N_y$ in the modulus $m_3$, there are three pulses concurrently carried on separate leads. For instance information representing the modulus $m_3$ portion of the number $N_x$ is carried on leads $0_{x3}$, $1_{x3}$, $2_{x3}$. The lead $0_{x3}$ carries a positive pulse to indicate that the modulus $m_3$ portion, or residue, of the number $N_x$ equals "0."Additionally the leads $1_{x3}$ and $2_{x3}$, respectively, carry positive pulses to indicate that the modulus $m_3$ portion, or residue, of the number $N_x$ has a value equal to their respective numerical designators "1" and "2." When any one of the leads $0_{x3}$, $1_{x3}$, and $2_{x3}$ has a positive pulse thereon, the other two leads of the subset $|x|_3$ have negative pulses thereon indicating the modulus $m_3$ portion of the number $N_x$ in a one-out-of-$m_3$ code. The leads of subset $|y|_3$ carry similar information with respect to the modulus $m_3$ portion, or residue, of the input number $N_y$.

Thus the translators 20 and 21 produce first and second sets of pulses representing the numbers $N_x$ and $N_y$ in bipolar signals that indicate residue numbers in a plurality of different moduli $m_i$. The first and second sets of pulses are in one-out-of-$m_i$ codes representing the numbers $N_x$ and $N_y$. These sets of pulses occur concurrently and are applied at once to arithmetic units 24 and 25. The arithmetic units 24 and 25 of FIG. 1 are arranged so that they perform arithmetic operations in accordance with rules of residue arithmetic, as stated in *The Residue Number System* by H. L. Garner, IRE Transactions on Electronic Computers, June 1959, pages 140–147 and in *Special Digital Techniques* by Philip W. Cheney, Electronic Progress, Spring 1964, pages 25–28.

Figure 2:
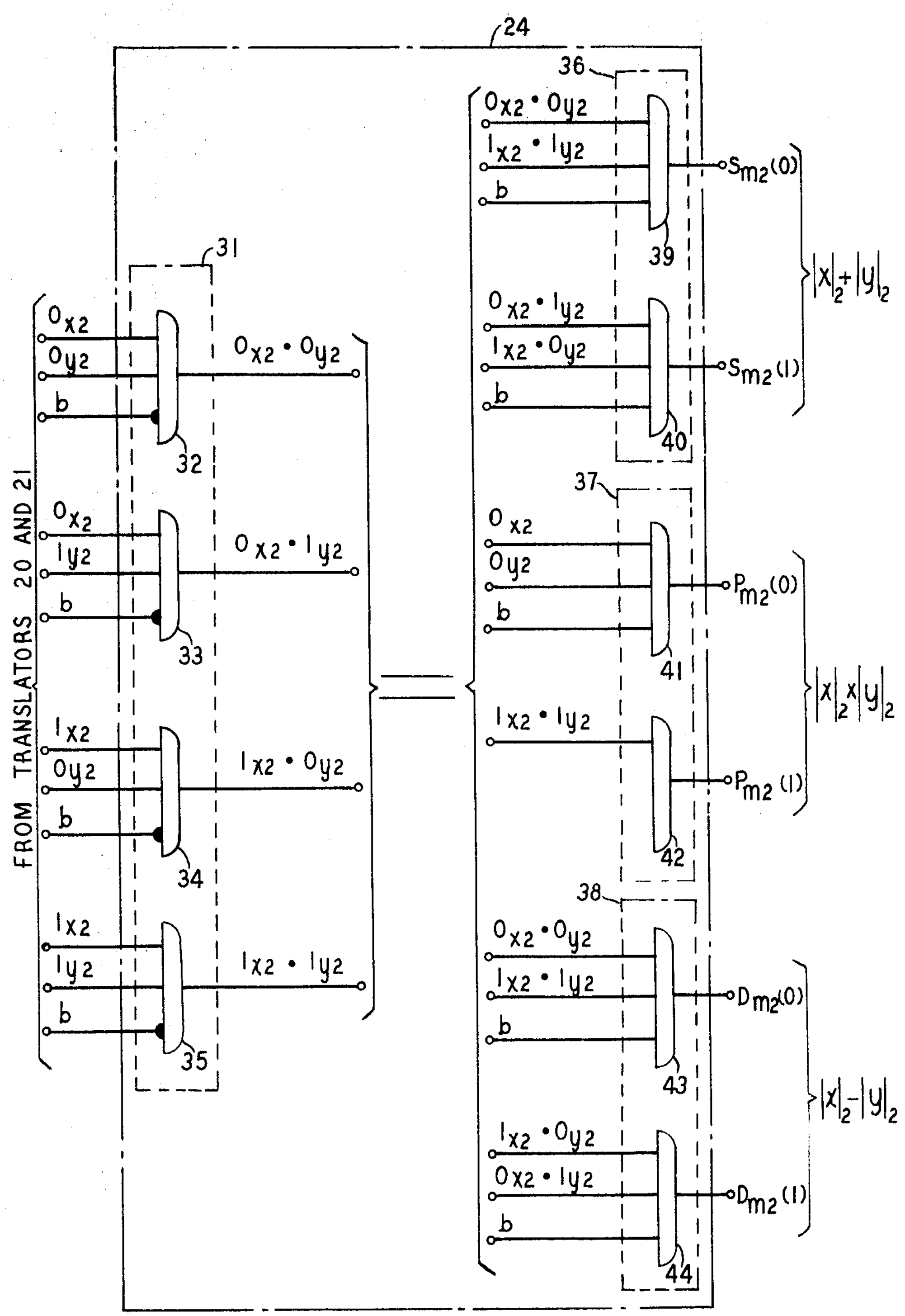
FIG. 2 is a logic diagram of a portion of the residue arithmetic unit of FIG. 1.
Figure 3:
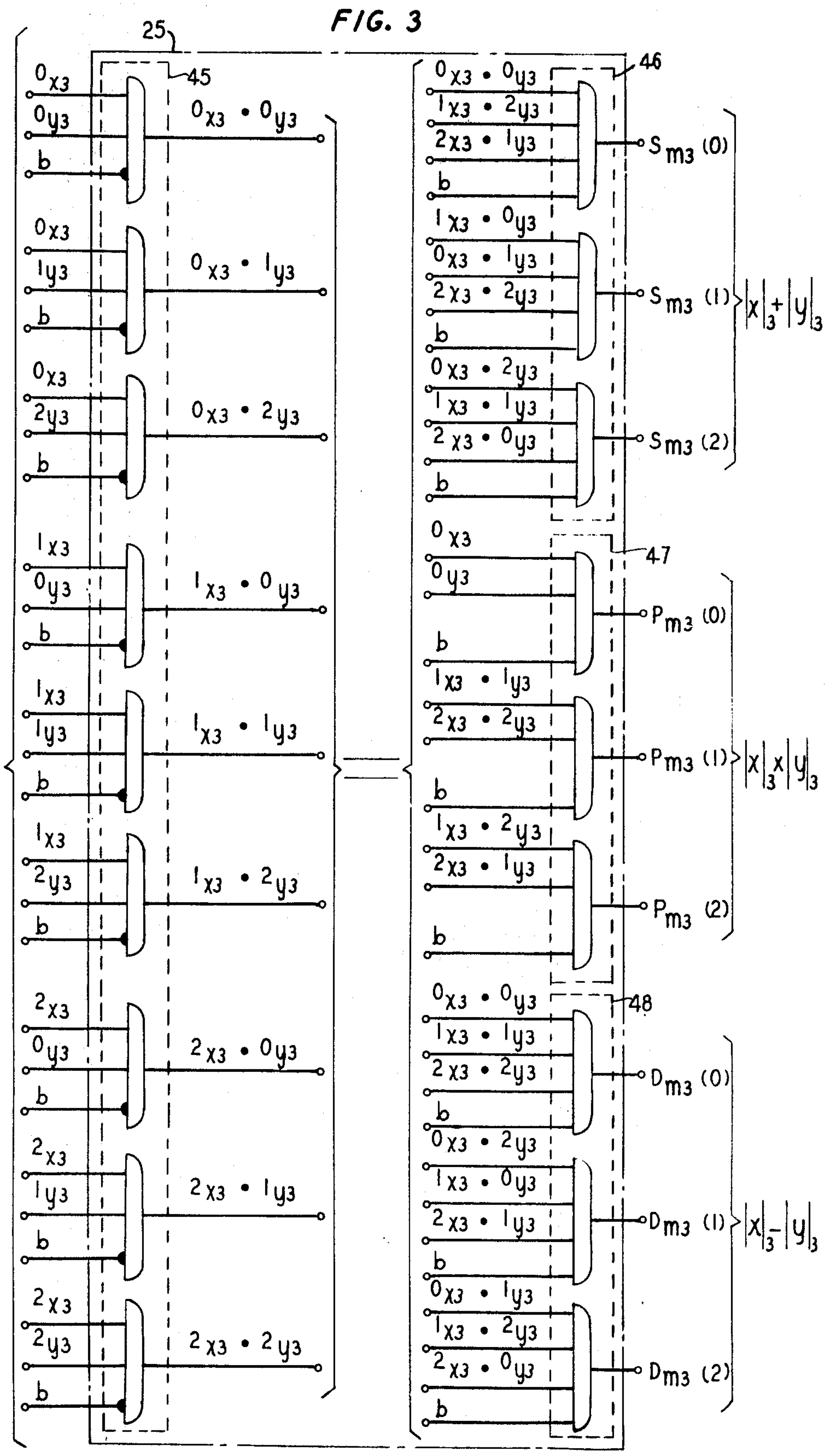
FIG. 3 is a logic diagram of another portion of the residue arithmetic unit of FIG. 1.

The arithmetic unit 24 operates on the modulus $m_2$ subsets of pulses and the unit 25 operates on the modulus $m_3$ subsets of pulses. Each of the units 24 and 25 comprises multiaperture ferrite structure AND gates and OR gates for performing logic functions on the subsets of pulses so that the OR gates produce output signals representing answers for residue arithmetic addition, multiplication, and subtraction on the numbers $N_x$ and $N_y$. Buffer apertures are interposed between the AND gates and the OR gates to prevent back transfers. A logic diagram for the unit 24 is shown in FIG. 2, and a similar logic diagram for the unit 25 is shown in FIG. 3. The units 24 and 25 are to be more fully explained hereinafter.

The outputs of the units 24 and 25 are sets of pulses representing, in the moduli $m_2$ and $m_3$, the residue arithmetic answers to the previously mentioned arithmetic operations performed on the numbers $N_x$ and $N_y$. For instance, the unit 24 produces the residue sum $|x|_2+|y|_2$ of the modulus $m_2$ residues, represented by the subsets $|x|_2$ and $|y|_2$ of the input numbers $N_x$ and $N_y$. This residue sum $|x|_2+|y|_2$ is produced on output terminals appropriately designated on the unit 24 by that same combination of symbols. The unit 25 produces the residue sum $|x|_3+|y|_3$ of the modulus $m_3$ residues, represented by the subsets $|x|_3$ and $|y|_3$, of the same input numbers $N_x$ and $N_y$. The residue sum $|x|_3+|y|_3$ is produced on output terminals appropriately designated on the unit 25 by that combination of symbols. The units 24 and 25 also produce the product and difference results of residue arithmetic operations performed on the moduli $m_2$ and $m_3$ residues of the numbers $N_x$ and $N_y$. These product and difference results are produced on different groups of output terminals appropriately designated by symbols including a product sign (×) and a minus sign (−).

In residue arithmetic operations in which an input decimal number is translated into two portions, such as the moduli $m_2$ and $m_3$ portions used in the embodiment of FIG. 1, the residue number of each portion taken separately is a single modulus residue number, but the residue numbers taken together form a combined residue number which is a variable moduli residue number. In a variable moduli number system having moduli which are relatively prime, there are as many unique combinations as the product of the variable moduli. Redundancies occur for numbers larger than that product. In accordance with residue arithmetic theory as stated by Cheney, supra, the single modulus residue number for the sum of two decimal numbers is equivalent to the sum of the single modulus residue numbers representing those same two decimal numbers. Likewise, a variable moduli residue number for the sum of two decimal numbers is equivalent to the sum of the variable moduli residue numbers representing those same two decimal numbers. Similar statements pertain to the product of and difference between two single modulus and two variable moduli residue numbers.

For example, if the modulus $m_2$ = mod (2) and the modulus $m_3$ = mod (3), as in the embodiment of FIG. 1, then

TABLE I

| | Residue | |
|---|---|---|
| | $\lvert x\rvert_2$ | $\lvert x\rvert_3$ |
| Decimal $x$: | | |
| 0 | (0) | (0) |
| 1 | (1) | (1) |

TABLE I—Continued

| | Residue | |
|---|---|---|
| | $\|x\|_2$ | $\|x\|_3$ |
| 2 | (0) | (2) |
| 3 | (1) | (0) |
| 4 | (0) | (1) |
| 5 | (1) | (2) |
| 6 | (0) | (0) |
| 7 | (1) | (1) |
| 8 | (0) | (2) |

To add 3+2 in the single modulus mod (2),
- for $x=3$ ; $|x|_2=(1)$ from TABLE I
- for $x=2$ ; $|x|_2=(0)$ from TABLE I
- then 3+2 ; (1)+(0)=(1), in accordance with single modulus residue arithmetic. For proof from TABLE I, when $x=5$ ; $|x|_2=(1)$.

To add 3+2 in the single modulus mod (3),
- for $x=3$ ; $|x|_3=(0)$ from TABLE I
- for $x=2$ ; $|x|_3=(2)$ from TABLE I
- then 3+2 ; (0)+(2)=(2), in accordance with single modulus residue arithmetic. For proof from TABLE I, when $x=5$ ; $|x|_3=(2)$.

To add 3+2 in the variable moduli mod (2) and mod (3),
- for $x=3$ ; $|x|_2, |x|_3=(1, 0)$ from TABLE I
- for $x=2$ ; $|x|_2, |x|_3=(0, 2)$ from TABLE I
- then 3+2 ; (1, 0)+(0, 2)=(1, 2), in accordance with variable moduli residue arithmetic. For proof from TABLE I, when $x=5$ ; $|x|_2, |x|_3=(1, 2)$.

Ambiguities which arise in the variable moduli number system of TABLE I can be eliminated by using one or more additional modulus numbers that are also relatively prime with the moduli $m_2$ and $m_3$ and with each other.

In a similar manner, examples can be shown of multiplication and subtraction of both single modulus and variable moduli residue numbers. Such examples are omitted, however, because they are merely examples of well-known residue arithmetic operations.

The timing control source 28 of FIG. 1 is coupled to all of the AND gate and OR gate circuits of the units 24 and 25 to synchronize the stepping of pulses through the gate circuits to the various groups of output terminals. The timing control source 28 is also coupled to a bias source 30 which generates bias pulses that are applied to the AND gates and OR gates of the units 24 and 25. The timing of the clock signal sequence and the response of the individual AND and OR gates to the clock signals will be more fully explained hereinafter.

Referring now to FIG. 2, there is shown a logic diagram of the arithmetic unit 24 which performs residue arithmetic logic operations in response to modulus $m_2$ subsets of pulses. The unit 24 includes two levels of logic.

A first level of logic gates 31 includes four multiaperture ferrite structure AND gates 32, 33, 34, and 35. Except for origins and destinations respectively of individual input and output signal windings, all of the AND gates 32, 33, 34, and 35 are alike. The particular sources of input windings and the particular destinations of output windings are indicated by the designations shown in FIG. 2. The input designations relate back to the outputs of the translators 20 and 21 and to the bias source 30, as shown in FIG. 1. The designations on the outputs of the AND gates 32, 33, 34, and 35 are switching algebra expressions for output combinations resulting from the particular input combinations of the respective gates. It should be noted that the group of AND gates 31 includes a sufficient number of AND gates so that there is a different AND gate for combining information from each winding carrying modulus $m_2$ residue pulses representing the numbers $N_x$ and $N_y$ with information from every other input winding carrying modulus $m_2$ residue pulses. Therefore, output functions representing all possible combinations of two pulses of the modulus $m_2$ subsets are generated by the group of AND gates 31.

A second level of logic gates includes three groups 36, 37, and 38 of multiaperture ferrite structure OR gates 39, 40, 41, 42, 43, and 44. All of the OR gates 39, 40, 41. 42, 43, and 44 are similar to one another except for the OR gate 42 which has fewer input windings. The groups 36, 37, and 38 respectively produce outputs representing the results of residue addition, multiplication, and subtraction operations on the modulus $m_2$ portions of the input numbers $N_x$ and $N_y$. Each of the groups of OR gates includes two OR gates, one for each numeral used in the modulus $m_2$ operations.

The logic of the OR gates is summarized in truth tables shown in FIGS. 6A, 6B, and 6C. FIG. 6A shows a truth table for the OR gates 39 and 40 which produce the residue sum $|x|_2+|y|_2$. FIG. 6B shows a truth table for the OR gates 41 and 42 which produce the residue product $|x|_2+|y|_2$. FIG 6C shows a truth table for the OR gates 43 and 44 which produce the residue difference $|x|_2-|y|_2$. The logic used to establish the truth tables of FIGS. 6A, 6B, and 6C is the logic of residue arithmetic, as previously mentioned.

For instance in FIG. 6A the logic for the OR gates 39 and 40 of FIG. 2 is presented as follows. The gate 39 produces an indication of the "0" numeral $S_{m2}(0)$ resulting from the residue sum of the modulus $m_2$ portions, or residues, of the numbers $N_x$ and $N_y$. Thus the OR gate 39 produces a positive output pulse indicating that $S_{m2}(0)$ is zero when the subsets $|x|_2$ and $|y|_2$ are concurrently zeros. This condition is represented by the input $0_{x2}\cdot 0_{y2}$ of OR gate 39 in FIG. 2 and by the top row of FIG. 6A. A positive output pulse is also produced by OR gate 39 to indicate that the sum $|x|_2+|y|_2$ equals zero when the subsets $x_2$ and $y_2$ are concurrent ones, that is, when $1_{x2}$ and $1_{y2}$ are both positive making the function $1_{x2}\cdot 1_{y2}$ also positive. This condition is represented in FIG. 2 by the input $1_{x2}\cdot 1_{y2}$ of OR gate 39 in FIG. 2 and in FIG. 6A by the second row from the top.

The gate 40 produces an indication of the output numeral $S_{m2}(1)$ resulting from the residue sum of the modulus $m_2$ portions of the numbers $N_x$ and $N_y$. The output $S_{m2}(1)$ is positive when the $|x|_2$ and $|y|_2$ portions of the input numbers $N_x$ and $N_y$ are complements of each other as indicated in the third and fourth rows of FIG. 6A.

The logic of multiplication and subtraction is shown respectively in FIGS. 6B and 6C. For instance, the output numeral $P_{m2}(1)$ resulting from the residue product of the modulus $m_2$ portions of the numbers $N_x$ and $N_y$ is shown in the bottom row of FIG. 6B. In addition the output numeral $D_{m2}(1)$ resulting from the residue difference of the modulus $m_2$ portions of the input numbers is shown in the bottom two rows of FIG. 6C. The output numerals $P_{m2}(0)$ and $D_{m2}(0)$ resulting from the product and difference operations are shown in the remaining portions of FIGS. 6B and 6C.

A description of the AND gates and the OR gates used in FIG. 2 is presented hereinafter following a brief description of FIG. 3 because the AND gates of FIG. 2 are similar to those of FIG. 3 and the OR gates of FIG. 2 are also similar to those of FIG. 3.

Referring now to FIG. 3, there is shown a logic diagram of the arithmetic unit 25 which performs residue arithmetic logic operations on the modulus $m_3$ subgroups of pulses. The unit 25 includes two levels of logic.

A first level of logic gates in the unit 25 includes nine multiaperture ferrite structure AND gates 45. The designations on the outputs of the AND gates are switching algebra expressions for output combinations resulting from the particular input combinations of the respective gates. The input windings are designated by the portion of the subsets of pulses $|x|_3$ and $|y|_3$ that they carry from the translators 20 and 21 of FIG. 1. Each input winding of the AND gates 45 carries information concerning one numeral of one of those two subsets of pulses. Bias windings $b$ are coupled to the AND gates 45 from the bias source 30, shown in FIG. 1. In FIG. 3 the AND gates 45 include a sufficient number of AND gates so that the AND gates generate an output function for every possible combination of two pulses resulting from the modulus $m_3$ subsets of pulses translated from the input number $N_x$ and $N_y$.

A second level of logic gates includes three groups of multiaperture ferrite structure OR gates 46, 47, and 48. The groups of OR gates 46, 47, and 48 respectively generate the sum of the modulus $m_3$ portions of the input numbers $N_x$ and $N_y$, the product of the modulus $m_3$ portions of the input numbers $N_x$ and $N_x$, and the difference between the modulus $m_3$ portion of the input number $N_x$ and the modulus $m_3$ portion of the input number $N_y$.

The logic of the individual gates of the groups of OR gates 46, 47, and 48 are summarized in the truth tables shown in FIGS. 7A, 7B, and 7C. FIG. 7A shows a truth table for the OR gates of group 46, which produce the residue sum $|x|_3+|y|_3$ in the circuit shown in FIG. 3. FIG. 7B shows a truth table for the OR gates of group 47 which produce the residue product $|x|_3 \times |y|_3$, as shown in FIG. 3. FIG. 7C shows a truth table for the OR gates of the group 48, which produce the residue difference $|x|_3-|y|_3$, also sown in FIG. 3. The logic used to establish the truth tables of FIGS. 7A, 7B, and 7C is the conventional logic of residue arithmetic. Once again there is one OR gate for producing each one of the three numerals which may result from each of the arithmetic operations performed in the modulus $m_3$ system.

Further description of residue arithmetic logic is omitted because full descriptions thereof are readily available for those who seek a more thorough explanation. See for example "Advanced Digital Computer Logic" by Aiken and Semon, Wright Air Development Center, 1959. Instead of further description of residue arithmetic logic, we turn to the illustrative embodiment of the invention, as further illustrated in FIG. 4.

Figure 4:
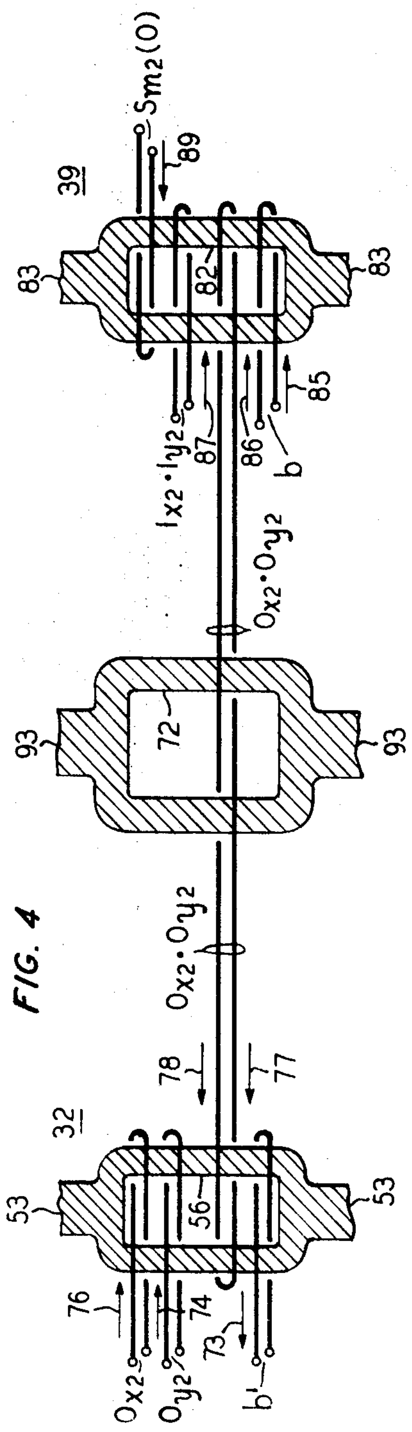
FIG. 4 is a wiring diagram of an illustrative AND gate intercoupled to an OR gate in accordance with the logic diagram shown in FIG. 2.

FIG. 4 is a wiring diagram showing interconnections of a typical AND gate and a typical OR gate for the residue arithmetic units of FIGS. 1, 2, and 3. By way of example in FIG. 4, there is shown only the AND gate 32 and the OR gate 39 associated with the residue sum output $S_{m2}(0)$ which relates to FIG. 2. The designators used in FIG. 4 are identical to those used in FIGS. 1 and 2 wherever they are applicable. Wiring for other AND gates and OR gates of FIGS. 2 and 3 can be demonstrated but is omitted from this discussion for the purpose of presenting a clear description of these two typical gates. A buffer aperture 72 is interposed along the transfer winding $0_{x2} \cdot 0_{y2}$ coupling and AND gate aperture to the OR gate aperture. Each of the apertures is on a separate ferrite structure which forms a closed magnetic path, as shown in FIG. 5.

Figure 5:
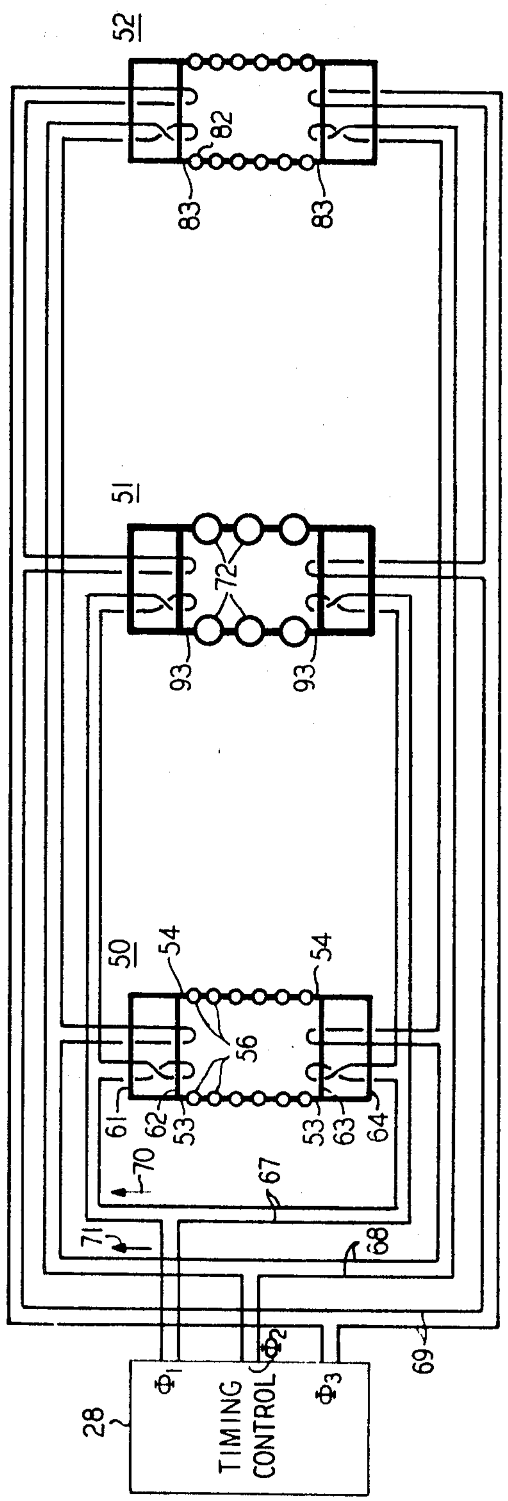
FIG. 5 is a wiring diagram for a timing circuit controlling a group of multiaperture ferrite structures used in the illustrative embodiment of FIG. 2.

In FIG. 5 there are shown three such ferrite structures 50, 51, and 52. The ferrite structure 50 has two vertical side legs 53 and 54 each having a plurality of apertures 56 interposed at regular intervals. In addition, there are four end rails which are flux sources used for controlling flux conditions in the vertical legs 53 and 54 and about the apertures 56, in a manner to be described. The magnitude of the total cross-sectional areas of the vertical legs 53 and 54 is essentially equal to the magnitude of the total cross-sectional area of end rails 61, 62, 63, and 64. The magnitude of the cross-sectional area of ferrite material on each curved side around the apertures 56 is approximately equal to half the magnitude of the cross-sectional area of either one of the vertical legs 53 or 54.

It is noted that the cross section of the apertures in the structure 51 is larger than the cross section of the apertures of the structures 50 and 52. The cross section of the apertures of structure 51 is larger because they are buffer apertures and the apertures of structures 50 and 52 are transformer apertures upon which logic gates are constructed. The cross section of buffer apertures is larger so that they are never saturated before the transformer apertures when a signal is being applied.

The ferrite structures 50, 51 and 52 are intercoupled with the timing control source 28 so that the timing control source 28 applied cyclical pump and clear pulses to the structures 50, 51, and 52. These pump and clear pulses are synchronized so that information pulses are cyclically stepped from left to right into and through some particular gate on the ferrite structure 50 to some predetermined gate on the ferrite structure 52. The pump and clear pulses are in three different phases. A first phase Φ is a pulse applied over the leads 67 as a pump pulse for the structures 50 and 51. A second phase $\Phi_2$ is a pulse applied over the leads 68 as a clear pulse for the structure 50 and as a pump pulse for the structure 52. A third purpose $\Phi_3$ is a pulse applied over the leads 69 as a clear pulse for the structures 51 and 52.

Thus the timing control circuit 28 is arranged to apply synchronized cyclical pump and clear pulses respectively through the leads 67 and 68 to the end rails 61, 62, 63, and 64 of the structure 50 for controlling flux in the vertical legs 53 and 54. A complete operating cycle for the structure 50 includes a pump operation, a clear operation, and an idle period. The pump and clear pulses are timed so that an AND function of a pair of information pulses applied to input windings of anyone of the AND gates built on the structure 50 temporarily is stored as a flux condition about that aperture in response to the pump pulse and thereafter is cleared out from that aperture for transfer to a gate on the structure 52 in response to the clear pulse.

In the pump operation of the structure 50 during each cycle, a positively polarity pulse is applied over the leads 67 to the windings linking the end rails 61, 62, 63, and 64. There are no concurrent pulses applied by way of the leads 68 and 69 to the structures 50, 51, and 52. The positive polarity pulse on leads 67 creates a current that flows toward the ferrite structure 50 in the direction indicated by arrow 70. The leads 67 are coupled in a figure-eight pump loop about the two end rails 61 and 62 and in another figure-eight pump loop about the two end rails 63 and 64. The current from the positive polarity pulse establishes flux that is poled toward the left in the end rails 62 and 63. Thus flux is coupled around two closed magnetic loops, one such closed magnetic loop includes the end rails 61 and 62 and the upper ends of the vertical legs 53 and 54. The second of such closed magnetic loops includes the end rails 63 and 64 and the lower ends of the vertical legs 53 and 54.

While flux is thus established in these two closed magnetic loops in response to the pump pulse, flux is neutralized in the remaining portions of the vertical legs 53 and 54 between the end rails 62 and 63, that is, there is no net flux poled either upward or downward in those remaining portions of the vertical legs 53 and 54. Since there is no net flux in the vertical legs 53 and 54, the flux surrounding each aperture 56 is also neutralized, however, there are three possible conditions of flux about each aperture 56, which will satisfy the neutralized flux condition. The first possibility is that flux surrounding any aperture 56 is neutralized on both sides of the aperture. A second possibility is that flux surrounding any aperture 56 is poled clockwise about the aperture so that flux poled downward on the right side of the aperture is equal in magnitude to flux poled upward on the left side of the aperture. A third possibility is that the flux surrounding any aperture 56 is poled counterclockwise about the aperture in a similar manner. All of these possible conditions are used advantageously in this illustrative embodiment of the invention, and all of these possible conditions of flux, surrounding each aperture 56, satisfy the condition that the flux in both of the vertical legs 53 and 54 is neutralized so that there is no net flux in those legs.

When the pump is first applied over the leads 67, the flux about each aperture 56 is essentially neutralized on both sides of the aperture, and information can then be written into any aperture 56 by applying information pulses to the aperture for tipping the flux. These applied information pulses tip the flux surrounding the particular aperture 56 either clockwise or counterclockwise depending on the polarity of the information signals to be written into the aperture. A more detailed description of the operation of multiaperture ferrite structure logic gates is contained in a thesis, presented to the University of Washington by R. B. Kieburtz and entitled "Bipolar Logic Operations Using Multi-Aperture Ferrite Structures," pages 30–34 and 80–89. Copies of this thesis are available from University Microfilms, 300 North Zeeb Road, Ann Arbor, Mich., 48106.

Referring once again to FIG. 2, it should be recalled that each of the AND gates of the group 31 is a logic circuit built on one of the apertures 56 of FIG. 5. Additional AND gates up to the number required by the FIGS. 2 and 3 can be provided by using additional structures like the structure 50 similarly coupled to the timing control circuit 28. One of such AND gates is AND gate 32, shown in detail in FIG. 4.

In FIG. 4 the AND gate 32 is shown built on one aperture 56 which is interposed on the vertical leg 53. Input windings $0_{x2}$ and $0_{y2}$, a bias winding $b'$, and an output winding $0_{x2}\cdot 0_{y2}$ are coupled through the aperture 56 in a manner that produces on the winding $0_{x2}\cdot 0_{y2}$ output pulses representing an AND function of the input pulses applied through the windings $0_{x2}$ and $0_{y2}$. It is noted that the designations used in FIG. 4 are identical with the designations of similar circuit elements shown in the FIGS. 1, 2, and 5.

During each pump operation of the structure 50 of FIG. 5, input pulses are applied to the winding $0_{x2}$, $0_{y2}$, and the bias loop $b'$ of FIG. 4 concurrently with the pump pulse applied to the structure 50 of FIG. 5. The flux surrounding the aperture 56 of FIG. 4 is neutralized, as previously described, and is tipped either clockwise or counterclockwise depending upon the combination of input signal pulses applied over the windings $0_{x2}$ and $0_{y2}$. A bias pulse from the bias source 30 shown in FIG. 1 is applied over the bias winding $b'$ so that a current is established in the direction of arrow 73 no matter what information is to be written into the AND gate during the pump pulse. The primed symbol $b'$ is used to designate this bias as a complement of a standard bias polarity to be used subsequently. It is noted that an unprimed symbol $b$ is used in FIG. 2, but the gate symbol used in FIG. 2 includes in the bias input a dot which indicates each bias input is complemented. The result is that the symbols used in FIGS. 2 and 4 correlate with each other.

Each pair of information pulses applied to the input loops $0_{x2}$ and $0_{y2}$ concurrently with the bias pulse and the pump pulse may be of either polarity. If for instance both input pulses are of positive polarity, they establish current in the direction of arrows 74 and 76. The currents from the bias pulse and the two information pulses each establishes a magnetomotive force of substantially equally magnitude about the aperture 56 because each winding makes one turn through the aperture. The magnetomotive force thus established by the current in the bias loop $b'$ is poled counterclockwise, and the magnetomotive force thus established by the information pulses on the loops $0_{x2}$ and $0_{y2}$ is poled clockwise. Since there are two increments of magnetomotive force poled clockwise and there is but one increment of magnetomotive force poled counterclockwise, the net magnetomotive force is therefore poled clockwise about the aperture 56. This net magnetomotive force establishes a flux condition which is retained after the pump pulse is terminated.

When the pump pulse is applied over the leads 67, it also neutralizes flux about the buffer apertures 72 of the structure 51 of FIG. 5. Each one of the buffer apertures 72 is used in a separate buffer coupling circuit extending from the output of one AND gate located on the structure 50 to the input of one OR gate located on the structure 52. These buffer coupling circuits are omitted from FIG. 5 because there are so many buffer coupling circuits that FIG. 5 would become unnecessarily complex, however, FIG. 4 does illustrate one such buffer coupling circuit.

In response to the pump pulse, the flux about aperture 72 of FIG. 4 is neutralized, in a manner similar to that previously described with respect to the flux about the aperture 56 of the AND gate 32. This enables a signal induced on the winding $0_{x2}\cdot 0_{y2}$ to establish a current in the leads coupling through the aperture 72 to an aperture 82 of the OR gate 39. This current is poled in the direction of the arrow 77 and tips the neutralized flux in aperture 72 so that a remanent flux is retained in the counterclockwise direction about the the aperture 72. There is no concurrent pump pulse applied to the structure 52, and the structure 52 is considered to be idled. Therefore the flux about the aperture 82 is not in a neutralized state and is not tipped into a new remanent condition in response to the current in the leads to the OR gate 39.

The example just described indicates how the remanent flux condition for the AND gate 32 and the buffer aperture 72 is achieved when two positive input information pulses are applied by way of the windings $0_{x2}$ and $0_{y2}$, but there are three other possible combinations of input pulses which can be applied to the loops $0_{x2}$ and $0_{y2}$. In accordance with Boolean logic for an AND gate, the remanent condition which is fixed by any of these other three combinations of input pulses will be poled counterclockwise about the aperture 56 as will be poled clockwise about the aperture 72.

Regardless of whether the remanent flux fixed about the apertures 56 and 72 is fixed in the clockwise or the counterclockwise direction in response to the input information pulses and the pump pulse, the pump pulse is terminated. The remanent flux remains fixed during the period from the time the pump pulse is terminated until the next subsequent clear pulse is applied to the structure 50 of FIG. 5.

After the pump pulse applied to the structure 50 has been terminated, the information, written into the AND gates of the apertures 56, is read out of them and is transferred through the separate buffer coupling circuits to the OR gates of structure 52. The transfer of information is accomplished by a clear signal which is applied to the AND gate ferrite structure 50 in time coincidence with a pump signal applied to the OR gate ferrite structure 52. Neither a pump pulse nor a clear pulse is applied concurrently to the structure 51 which is considered to be idled during the clearing of the gates on the structure 50.

During the clear operation of the structure 50, the timing control circuit 28 applies a positive polarity pulse to the leads 68 so that current components of brief duration are established in the directions of the arrows 71. These current components produce flux poled to the left in the end rails 61 and 62 and to the right in the end rails 63 and 64. A resultant flux, which is approximately equal in magnitude to the sum of the flux in the end rails 61 and 62, is poled downward through the vertical leg 53. In addition, another resultant flux of the same magnitude is poled upward through the vertical leg 54. Because of the resultant flux in the vertical legs 53 and 54, the flux which existed on one side of each aperture 56 is switched in polarity. This switching of flux on one side of each aperture generates an output signal on output, or transfer windings of the respective apertures.

If the remanent flux which was about the aperture 56 of FIG. 4 was fixed in the clockwise direction that portion of the remanent flux in the left-hand side of the aperture 56 is switched in polarity. This switching of the remanent flux causes an output pulse on the output winding $0_{x2}\cdot 0_{y2}$. Since the clockwise flux condition represents the prior coincident positive polarity pulses on the loops $0_{x2}$ and $0_{y2}$ during the pump operation, as previously described, the pulse on the output loop $0_{x2}\cdot 0_{y2}$ during the clear operation is also considered to be of positive polarity and is poled in the direction of the arrow 78.

If the flux stored in the aperture 56 had been poled counterclockwise, the flux in the right-hand leg of the aperture 56 would have been switched inducing a voltage which causes a negative polarity current in the direction of arrow 77 in the output winding $0_{x2}\cdot 0_{y2}$ indicating prior noncoincidence of positive polarity input pulses on the windings $0_{x2}$ and $0_{y2}$.

All of the AND gates of FIGS. 2 and 3 are built similar to the AND gate of FIG. 4. Therefore, all of the AND gates in FIGS. 2 and 3 include a complement bias winding $b$ which is similar to the bias loop $b'$ described in regard to the gate 32 of FIG. 4, however, each of the additional AND gates has a different combination of input windings coming from the translators 20 and 21 of FIG. 1. The output winding of each of the AND gates of the FIGS. 2 and 3 is coupled separately through an individual buffer aperture of structure 51 in FIG. 5 to a particular OR gate where the same winding is an input winding. Additional structures like structure 51 of FIG. 5, but not shown, are also to be coupled to the timing control circuit 28 so that there is one buffer aperture 72 for each AND gate shown in FIGS. 2 and 3.

When the output current flows in the winding $0_{x2}\cdot 0_{y2}$ of FIG. 4 in response to the clear pulse applied to the structure 50 of FIG. 5, the buffer aperture 72 of FIG. 4 is a shuttled while it is being idled resulting in no switching of its remanent flux condition. The current continues along the closed winding to the OR gate 39.

The OR gate 39 is shown built on an aperture 82 that is interposed in a vertical ferrite leg 83 of the ferrite structure 52 shown in FIG. 5. As previously mentioned, the timing of pump and clear pulses applied to the OR gate ferrite structure 52 is coordinated in sequence with the pump and clear pulses applied to the AND gate ferrite structure 50. The pump pulse applied to the ferrite structure 52 concurs with bias pulses applied to the OR gates and with the clear pulse applied to the ferrite structures 50. Output pulses, which are concurrently produced on the output windings $0_{x},\cdot 0_{y2}$ and $1_{x2}\cdot 1_{y2}$, shown in FIG. 2, are coupled by way of those windings from the apertures 56 of the structure 50 through their associated buffer apertures 72 of the structure 51 to the input windings $0_{x2}\cdot 0_{y2}$ and $1_{x2}\cdot 1_{y2}$ of the OR gate 39 shown in FIG. 4.

Since the output pulses from the AND gates 32 and 35, shown in FIG, 2, concur in time coincidence with the pump pulse applied to the ferrite structure 52 of FIG. 5 and with the bias pulse to the OR gate 39, information is thereby written into the OR gate 39 in accordance with the logical combination of the information pulses coupled thereto. Referring once again to FIG. 4 for example, the input information windings $0_{x2}\cdot 0_{y2}$ and $1_{x2}\cdot 2_{y2}$, a bias winding $b$, and an output winding $S_{m2}(0)$ are coupled through the aperture 82 in a manner that produces output pulses representing an OR function of the input information pulses.

During the interval in which each pump pulse is applied to the ferrite structure 52, the flux surrounding the aperture 82 of FIG. 4 is neutralized, as previously described in regard to the ferrite structure 50. Then flux is tipped either clockwise or counterclockwise about the aperture 82 depending upon the combination of input information signals concurrently applied. The bias pulse applied over the bias winding $b$ is such that a current is established in the direction of arrow 85 no matter what information is to be written into the OR gate 39. Concurrently, information pulses are applied through the input windings $0_{x2}\cdot 0_{y2}$ and $1_{x2}\cdot 1_{y2}$. Each of these information pulses may be of either polarity. If they both are of positive polarity, they establish current in the direction of arrows 86 and 87. The magnitude of the magnetomotive force established by each one of these information pulses and by the bias pulse is substantially the same as the magnitudes of the others. Because of the polarity of the input currents, each increment of magnetomotive force is poled clockwise about the aperture 82. The resultant flux condition, which is established by the bias pulse and the two positive information pulses, is poled clockwise about the aperture 82, where it is retained as a remanent flux condition after the pump pulse terminates.

The example just described indicates the flux conditions for one combination of input information pulses to the OR gate 39. There are three other possible input information pulse combinations which can be applied to the OR gate 39. In accordance with Boolean logic for an OR gate, the remanent flux condition, which is retained in response to all but one of the remaining combinations of input pulses, will likewise be poled clockwise. The last combination, wherein both input information pulses are of negative polarity, will fix a remanent flux condition that is poled counterclockwise about the aperture 82.

No matter which direction the remanent flux condition is fixed about the aperture 82 in response to the input information pulses and the bias pulse, the remanent flux condition remains fixed during the period from the time the pump pulse applied to the structure 82 terminates until the next subsequent clear pulse is applied to that structure.

When a clear pulse is applied to the ferrite structure 52, that clear pulse is concurrently applied to the structure 51. No pump pulse nor clear pulse is concurrently applied to the structure 50 which is considered to be idled.

Flux in the vertical leg 83 is established in the downward direction, in a manner that is similar to that described with respect to the structure 50. If the remanent flux fixed about aperture 82 is clockwise in accordance with the previously stated example, that portion of the flux in the left-hand side of the aperture 82 is switched in polarity in response to the clear pulse. This switching of flux induces a voltage pulse on the output loop $S_{m2}(0)$. Since this clockwise remanent flux condition represents the prior occurrence of a positive polarity pulse on either one of or on both of the two windings $0_{x2}\cdot 0_{y2}$ or $1_{x2}\cdot 1_{y2}$ during the just-completed pump operation, in accordance with Boolean logic the pulse on the output loop $S_{m2}(0)$ during the clear operation is also considered to be of positive polarity and is poled in the direction of arrow 89. If the flux stored in the aperture 82 had been poled counterclockwise, the flux in the right-hand leg of aperture 82 would have been switched causing a negative polarity pulse in the output winding $S_{m2}(0)$ indicating coincidence of negative polarity input pulses on both of the input windings $0_{x2}\cdot 0_{y2}$ and $1_{x2}\cdot 1_{y2}$ when the pump pulse was applied to the structures 52.

As previously stated the clear pulse, applied to the structure 52, is concurrently applied to the structure 51 of FIG. 5. The clear pulse applied to the structure 51 causes flux to be directed downward through a vertical leg 93 and downward around both sides of the aperture 72 of FIG. 4. The remanent flux which had been poled upward on the right-hand side of the aperture 72, as a result of the pump operation concerning structures 50 and 51, is thereby switched. This switching of flux about the aperture 72 induces a voltage in the winding $0_{x2}\cdot 0_{y2}$.

The clear pulse applied to the structure 52 also induces a voltage in the winding $0_{x2}\cdot 0_{y2}$. In accordance with our example, remanent flux about the aperture 82 was poled clockwise while the remanent flux about the aperture 72 was poled counterclockwise just prior to the clear pulse. The switched flux induces two oppositely poled voltage pulses in the winding $0_{x2}\cdot 0_{y2}$. Since both flux conditions are switched concurrently, the voltages induced by the oppositely poled flux changes offset each other. Thereby these induced voltage are cancelled in the winding $0_{x2}\cdot 0_{y2}$. Thus no signal is sent back to the aperture 56 of the AND gate 32.

It is possible for the remanent flux condition in aperture 82 to be the same polarity as the remanent flux about the apertures 72 of FIG. 4. Any clear pulse, then applied concurrently to the structures 51 and 52, would create in the winding $0_{x2}\cdot 0_{y2}$ two voltage pulses that are in phase with each other. This combination of voltage pulses in winding $0_{x2}\cdot 0_{y2}$, however, occurs at a time when the structure 50 of FIG. 5 is being idled, that is, the structure 50 is not subjected to either a pump or a clear pulse. As a result the flux surrounding the aperture 56 of FIG. 4 is left in a state which will respond correctly when the next subsequent pump pulse is applied to the AND gate 32.

It has been found that in some circumstances erroneous signals may be transferred back from the OR gates to the AND gates as a result of the coupling arrangement between AND gates and OR gates. Such erroneous signals can be eliminated by introducing intermediate coupling loops between the AND gates and the OR gates.

The intermediate coupling loops are to be arranged as shown in FIG. 8. All of the coupling loops in FIG. 8 are shown in simplified form wherein they couple through each aperture only once, but it is to be understood that all of the loops are actually coupled to each aperture by means of a figure-eight winding, such as those shown in FIG. 4. The apertures shown in FIG. 8 are all in separate ferrite structures. The leftmost aperture is aperture 56' which is analogous to the aperture 56 of AND gate 32 shown in FIG. 4. A first winding 101 which is the output winding of AND gate 32 couples the aperture 56 through a buffer aperture 102 to a transformer aperture 013.

A second winding 104 couples the transformer aperture 103 through a second buffer aperture 106 to a second transformer aperture 107. A third winding 108 couples the transformer aperture 107 through a third buffer aperture 109 to aperture 82' which is analogous to aperture 82 of the OR gate 39 of FIG. 4. The winding 108 therefore may be considered to be one of the input windings of the OR gate 39.

In conjunction with FIG. 8 there is shown a timing diagram for clock phases $\Phi_1$, $\Phi_2$, and $\Phi_3$ which are applied to the chain of apertures shown in FIG. 8. In the timing diagram each letter P indicates a pump pulse is applied during the particular clock phase, in which that letter P occurs, to the structure including the aperture shown thereabove in FIG. 8. The particular phase, such as phase $\Phi_1$, is shown in the leftmost column of the timing diagram. Each letter C in FIG. 8 indicates a clear pulse is applied to the appropriate ferrite structure shown thereabove also in time with the phase shown in the left-hand column. Each dash in FIG. 8 indicates the appropriate ferrite structure shown thereabove is idled in the phase shown in the left-hand column.

This arrangement of intermediate windings between each AND gate and each OR gate substantially eliminates any possibility of back transfers from the OR gates to the AND gates and thereby eliminates storage of erroneous information in the AND gates as a result of such back transfers. Of course additional ferrite structures and windings are required to realize these intermediate windings. Additional intermediate logic transfers are required for temporary storage of information about the apertures 103 and 107, but improved reliability of operation offsets any additional cost resulting from the additional material and the additional complexity resulting from the inclusion of these intermediate coupling loops.

Referring once again to FIGS. 2 and 3 the other OR gates are built similar to the OR gate 39 of FIG. 4. Except for OR gate 42, the OR gates of FIGS. 2 and 3 each have a bias loop *b* and some combination of input windings. Each of the OR gates, however, has a different combination of input windings coupled thereto from the outputs of the various AND gates or from the outputs of the translators 20 and 21, as indicated by their respective designators. In FIG. 3, many of the OR gates have three input windings in addition to the bias winding. Each three input OR gate requires a bias loop having two figure-eight turns through the aperture to develop sufficient magnetomotive force for proper operation as an OR gate. Conversely, the OR gate 42 requires no bias loop because there is but one input winding and the total number of input loops must be odd for assuring that flux tips one way or the other about the aperture in response to input signals.

Although FIGS. 2 and 3 show logic interconnections for performing all the residue arithmetic operations of addition, multiplication, and subtraction, it is obvious that one or more of the groups of OR gates shown in FIGS. 2 and 3 can be omitted leaving a more limited special purpose computational circuit.

Since the ferrite structures 50, 51, and 52 are energized periodically by pump and clear pulses, the write-in and readout operations impart gain to the information signal. Such signal gain is discussed in detail in the "1964 International Solid State Circuits Conference—Digest of Technical Papers," page 17 and in the "1965 Proceedings of the Intermag Conference," pages 4.6–1 through 4.6–7. Thus when an information signal is read out of any aperture, there is sufficient signal amplitude for operating the next gate to which it is coupled. This signal amplitude is sufficient without the insertion of other types of amplification circuits, such as semiconductor circuits. Thus the elimination of such other amplification circuits eliminates the need for semiconductor amplifiers and leaves an entirely magnetic logic circuit having a plurality of levels of logic. Such an entirely magnetic logic circuit is not subject to malfunctions arising in semiconductor circuits operated in nuclear radiation fields or in any other high ambient electrical noise environment.

What is claimed is:

1. A residue arithmetic unit comprising a plurality of multiaperture magnetic devices, a level of AND gates, each AND gate being arranged on only one aperture of a first one of the multiaperture magnetic devices, a level of OR gates connected to the AND gates, each OR gate being arranged on only one aperture of a second one of the multiaperture magnetic devices, means for producing first, second, and third control signals, means for applying the first and the second control signals to the first multiaperture magnetic device respectively for storing information in said AND gates of said first device and for clearing information from said AND gates of said first device, and means for applying the second and the third control signals to the second multiaperture magnetic device respectively for storing information in said OR gates of said second device and for clearing information from said OR gates of said second device.

2. A residue arithmetic unit in accordance with claim 1 further comprising first means for applying a group of input signals in one-out-of-$m_i$ codes, representing a first residue number in a plurality of moduli $m_i$, to the AND gates, second means for applying a group of input signals in the one-out-of-$m_i$ codes, representing a second residue number in the same moduli $m_i$, to the AND gates, and means including the OR gates for producing a group of output signals in the one-out-of-$m_i$ codes, representing a predetermined residue number in the same plurality of moduli $m_i$, in response to a complete cycle of the first, second, and third control signals.

3. A data processor comprising a first source producing a first group of pulses in one-out-of-$m_i$ codes, representing a first input number in a plurality of moduli $m_i$, where *i* identifies relatively prime radices, a second source producing a second group of pulses in the one-out-of-$m_i$ codes, representing a second input number in the same plurality of moduli $m_i$, magnetic circuit means comprising first, second, and third magnetic structures each structure including a plurality of balanced magnetic apertures, the first structure further comprising a level of AND gates, each AND gate being arranged on an individual aperture of said first structure, means responsive to signals from said first and second sources for storing information about said apertures of said AND gates, and means for clearing said stored information from said apertures of said AND gates, the second structure further comprising a level of buffer circuits, each buffer circuit being arranged on an individual aperture of said second structure, means responsive to signals being stored in said AND gates for storing information about said apertures of said buffer circuits, and means for clearing said stored information from said apertures of said buffer circuits, the third structure further comprising a level of OR gates, each OR gate being arranged on an individual aperture of said third structure, means responsive to information cleared from said AND gates for storing information about said apertures of said OR gates, and means for clearing information from said apertures of said OR gates for producing an output signal representing a predetermined number in the same plurality of moduli $m_i$, and clock means applying first, second and third control signals to the first, second, and third structures.

4. A data processor in accordance with claim 3 further comprising means including the first structure and responsive to the first control signal for storing in the first structure information from the first and second sources, means including the second structure and responsive to the first control signal for storing in the second structure the same information being stored in the first structure, means including the first structure and responsive to the second control signal for clearing information from the first structure, means including the third structure and responsive to the second control signal for storing in the third structure information cleared from the first structure, means including the third structure and responsive to the third control signal for clearing information from the third structure, means including the third structure and responsive to the third control signal for sending erroneous signals from the third structure toward the first structure, and means including the second structure and responsive to the third control signal and information stored in the second structure for generating signals opposing the erroneous signals from the third structure.

5. A data processor in accordance with claim 4 further comprising means for applying bias signals of a first polarity to apertures of the first structure, and means for applying bias signals of a second polarity to apertures of the second structure.

6. A data processor in accordance with claim 5 in which the level of OR gates comprises means producing a group of output pulses representing a residue product of the first and second input numbers.

7. A data processor in accordance with claim 5 in which the level of OF gates comprises means producing a group of output pulses representing a residue difference between the first and second input numbers.

8. A data processor in accordance with claim 5 in which the level of AND gates and the level of OR gates both comprise means producing output pulses having magnitudes equal to or greater than magnitudes of the first and second groups of pulses.